UNITED STATES PATENT OFFICE.

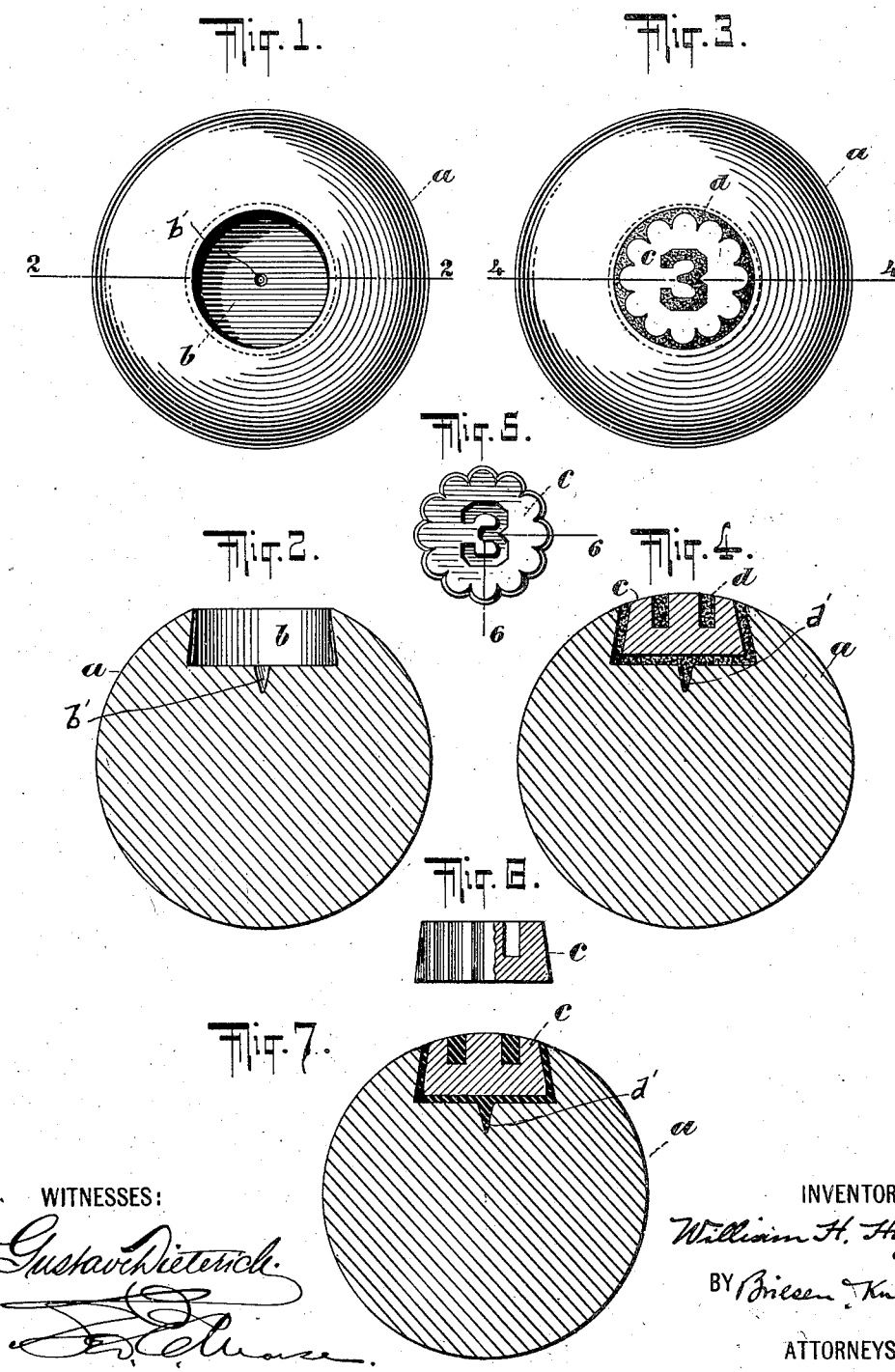

WILLIAM H. HOYT, OF WYOMING, NEW JERSEY, ASSIGNOR TO THE BURT COMPANY, OF MILBURN, NEW JERSEY, A CORPORATION OF NEW JERSEY.

GAME-BALL AND METHOD OF MAKING SAME.

SPECIFICATION forming part of Letters Patent No. 695,153, dated March 11, 1902.

Application filed March 22, 1901. Serial No. 52,272. (No model.)

*To all whom it may concern:*

Be it known that I, WILLIAM H. HOYT, a citizen of the United States, residing at Wyoming, Essex county, State of New Jersey, have invented certain new and useful Improvements in Game-Balls and Methods of Making the Same, of which the following is a specification.

My invention relates to game-balls and the manufacture thereof.

In the accompanying drawings I have shown a game-ball embodying my invention.

In the drawings, Figure 1 is a face view of the body of the ball before the final forming or integrating pressure has been given and showing the recess for the spot. Fig. 2 is a section on line 2 2 of Fig. 1. Fig. 3 is a similar view of the ball, showing the spot set in place. Fig. 4 is a section on line 4 4 of Fig. 3. Fig. 5 is a face view of the spot. Fig. 6 is a sectional side view of the spot, the section being taken on line 6 6 of Fig. 5; and Fig. 7 is a sectional view similar to Fig. 4, showing the finished ball.

In the drawings, $a$ represents the body of the ball, made of plastic material, herein shown as spherical, and having the recess $b$ therein for the spot $c$, with a central inwardly-extending socket $b'$. This spot is herein shown as a disk-like body having a fluted or non-circular outline and recessed to form the number. This spot is adapted to fit loosely in the recess $b$.

In carrying out my process I first form the body $a$ of plastic material, preferably cold, and insert therein the spot $c$, which has been formed up cold from plastic material. The socket $b'$ and the space between the bottom and wall of the recess $b$ and the spot $c$ are filled in with loose granular or pulverulent plastic material $d$, and the number-recess in the spot is likewise filled in with plastic material $d$. The material which fills the socket $b'$ forms a spur $d'$. I prefer that the ball-body, the spot, and the plastic filling should be of contrasting colors or tints. For instance, the body of the ball shown is red, the spot white, and the plastic filling black. After the ball has been built up, as described and as shown in Fig. 4, it is compressed under great pressure and at a considerable temperature, preferably about 250° Fahrenheit, and is trued off by turning and polishing. The ball thus constructed will be found in use to be very elastic and lively, and the spot is very nicely amalgamated with the ball-body.

Having described my invention, what I claim, and desire to secure by Letters Patent, is—

1. As a new and useful article of manufacture, a game-ball composed of a body of plastic material and a spot set in said body and having its side surface fluted longitudinally.

2. The process of producing game-balls, which consists in forming a body of plastic material by pressure, forming a spot of plastic material by pressure in a cold state, inserting the spot into a recess of the body with an interposed layer of loose comminuted plastic substance and integrating the spot, body and interposed layer by heat and pressure.

3. As a new and useful article of manufacture, a game-ball composed of a body of compressed plastic material and a solid spot the exposed surface of which has a non-circular outline said spot being inserted in and united to the body to form an integral whole.

W. H. HOYT.

Witnesses:
SED. E. MORSE,
OTTO V. SCHRENK.